(No Model.)
D. K. ALLINGTON.
BAND SAW MILL.
No. 327,428. Patented Sept. 29, 1885.
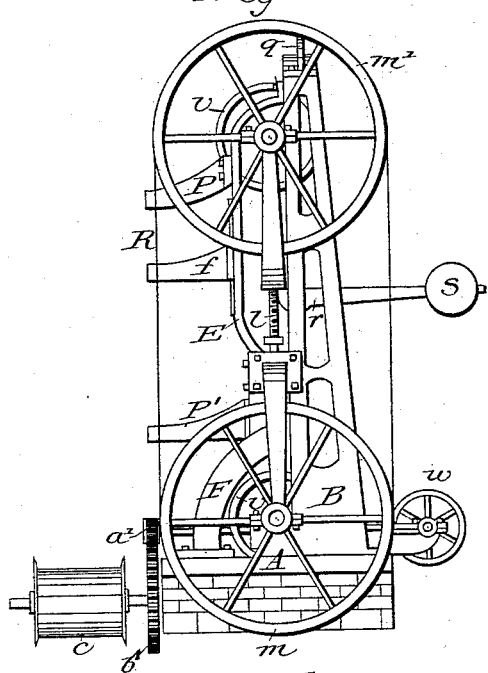
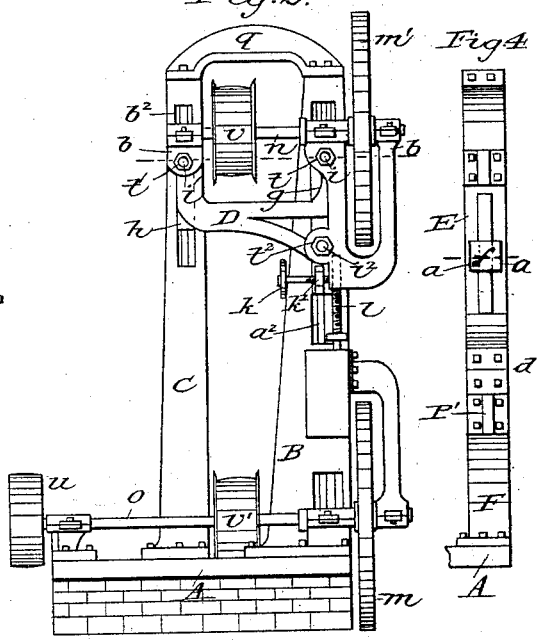
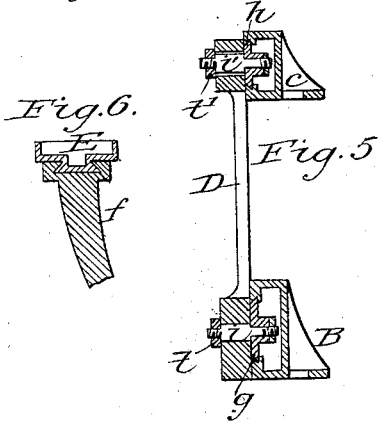
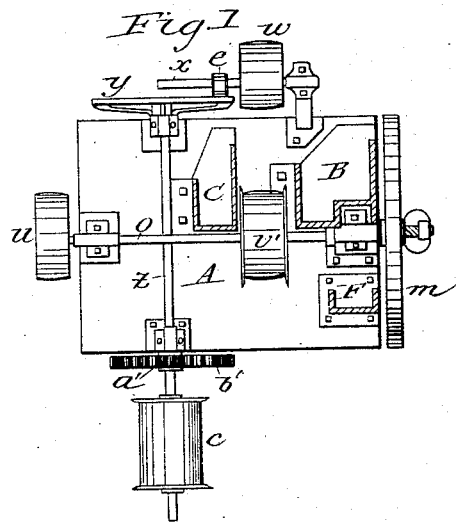
Witnesses:
F. E. Moore.
G. Telfer.
Inventor:
D. K. Allington

UNITED STATES PATENT OFFICE.

DAVID K. ALLINGTON, OF EAST SAGINAW, MICHIGAN.

BAND-SAW MILL.

SPECIFICATION forming part of Letters Patent No. 327,428, dated September 29, 1885.

Application filed June 2, 1885. (No model.)

*To all whom it may concern:*

Be it known that I, DAVID K. ALLINGTON, a citizen of the United States, residing at East Saginaw, county of Saginaw, and State of Michigan, have invented a new and useful Improvement in Band-Saw Machines, of which the following is a specification.

My invention relates to endless-band-saw machines in which the saw runs continuously in the same direction; and the object of my invention is, first, to construct a band-saw machine so that the upper saw-wheel can be hung on a shaft of considerable length having a sufficient number of bearings to secure a greater steadiness of motion than those now in use; second, the upper shaft and saw-wheel to be adjustable for different lengths of saws, and also to any desirable guide of the saw, so that when in adjustment they will be more rigid and run more steadily than those now in use, and, third, my machine is so constructed that the speed of the upper saw-wheel will not, from its momentum, overrun the speed of the lower or driving saw-wheel when its speed is retarded by the saw entering the cut or any other cause. I attain these objects by the mechanism illustrated in the accompanying drawings, in which—

Figure 1 is a plan view of the machine, showing the relative position of the different parts. Fig. 2 is a front view with the brackets E and F (shown in Fig. 4) left off of the main column B, so as to show more clearly the arrangement for adjusting the upper saw-wheel, $m'$. Fig. 3 is a side view showing the brackets E and F in their places on the column B. Fig. 4 is a front view of the brackets E and F, that are bolted to the front of the column B and meet at $d$. Fig. 5 is an enlarged sectional view through the dotted lines $b\ b$ in Fig. 2, showing the construction of the different parts. Fig. 6 is an enlarged sectional view through the dotted line $a\ a$ in Fig. 4.

Similar letters refer to corresponding parts throughout the several views.

In the accompanying drawings, A is a base-plate, constructed so that it can be securely bolted to any suitable foundation, on which is erected and securely fastened the columns B and C, which are provided with suitable journal-brackets to receive the shafts $x$ and $z$. The shaft $x$ is provided with the pulley $w$ and friction-pulley $e$. The shaft $z$ is provided with the friction-disk $y$ and gear-wheel $a'$, which meshes into and drives the gear-wheel $b'$, and spool and shaft $c$, which in turn drives the feed mechanism or any other work to which it may be applied. On the base-plate A is also journaled the shaft $o$, provided with the pulley $u$, to drive the machine from any suitable power, and the pulley $v$ and saw-wheel $m$, which is to receive and drive the endless band-saw R. The main supporting-column B is constructed, substantially as shown, with a recess, $a^2$, to receive the vertically-sliding plate $g$, and is provided with the bracket E, which meets the supporting-bracket F at $d$, and is securely fastened to the column B at each end. The bracket E is provided with the stationary bracket-arm P, securely fastened thereto, the outer end being provided with a suitable guide to prevent vibration of the saw as it leaves the saw-wheel $m'$, and the vertically-adjustable guide-bracket arm $f$, which slides vertically on a projected beveled plate, as shown in cross-section at Fig. 6, that can be adjusted vertically to any desired point selected by the operator, its outer end being provided with a suitable guide for the saw above the cut.

The supporting-bracket F meets the bracket E at $d$, and is securely fastened to the column B at the top end and to the base-plate A at the bottom end, and is provided with the stationary bracket-arm P', securely fastened thereto, which is provided at its outer end with a suitable guide for the saw below the cut. The auxiliary supporting-column C is constructed with a recess, $b^2$, for the reception of the vertically-sliding plate $h$, and is constructed substantially the same as the main column B, without the brackets E and F, and may be of smaller dimensions in cross-section, and is securely fastened to the base-plate A in position so that the shaft $n$ will be in line or parallel with the shaft $o$, journaled on the base-plate A.

The columns B and C are provided with the cap $q$, securely fastened to the tops of each, rigidly joining them together, so that each is a support to the other.

In the recess $a^2$ in the column B is fitted the beveled vertically-sliding plate $g$, having beveled edges fitting in corresponding-beveled grooves, which is provided with the pin $i$, near the upper end, securely fastened in said plate by a key or nut on its inner end, and provided with a nut, $t$, on its outer end, as shown in cross-section at Fig. 5. It is also provided with the pin $i^2$ near its bottom end, constructed and secured the same as the pin $i$ near the upper end, and provided with the nut $t^2$ on its outer end. Below this pin is a bracket, $k'$, in which is threaded the adjusting-screw $k$, acting on the lower end of the adjustable yoke-bracket D, giving it the desired adjustment to guide the saw.

In the recess $b^2$, in the auxiliary supporting column $c$, is fitted the vertically-sliding plate $h$, which is constructed substantially the same as the vertically-sliding plate $g$ in the column B, without the lower pin, and provided with the pin $i'$, which is fastened the same as the pin $i$ in the sliding plate $g$, with the nut $t^2$ on its outer end, as shown in cross-section at Fig. 5.

The adjustable yoke-bracket D is constructed substantially as shown, provided with three journal-boxes at the top, in which is journaled the shaft $n$, which is provided with the pulley $v$ and saw-wheel $m'$, and is hung on the pins $i$ and $i^2$ in the vertically-sliding plate $g$ in the column B, and on the pin $i'$ in the vertically-sliding plate $h$ in the column C. The hole in the adjustable yoke-bracket D, that receives the pin $i$ in the vertically-sliding plate $g$ in the column B, is made to fit the pin, and the holes that receive the pins $i'$ in the sliding plate $h$ in the column C, and $i^2$ in the sliding plate $g$ in the column B, are made larger than the pins, so as to allow the adjustable swinging yoke-bracket D to swing backward and forward on the pin $i$ for a short distance, so that the shaft $n$ and saw-wheel $m'$ may be adjusted in either direction that may be desired to give the proper guide to the saw. This adjustment is made by operating the adjusting-screw $k$, as before described. When this adjustment is made, to give the desired guide to the saw the nuts $t'$ and $t^2$, that are on the pins $i'$ and $i^2$, are tightened, rigidly securing the yoke-bracket D firmly to the sliding plates $g$ and $h$ in the desired position. The adjustable yoke-bracket D is operated vertically to compensate for different lengths of saws, and to put the desired strain in the saw by the vertical adjusting-screw $l$, which is threaded in the adjustable yoke-bracket D, and rests in a projection in the column B, as shown in Fig. 2. When the saw is put in the desired strain by the adjusting-screw $l$, any expansion that increases its length is provided for by the lever $r$ and weight S, acting on and raising the yoke-bracket D, thereby keeping the saw in even strain, this adjustment being made before the above-described adjustment to guide the saw.

The pulley $v$ on the shaft $n$ may be used to transmit power to the pulley $w$ on the shaft $x$, which may be located in any convenient place to receive the power, from which power may be transmitted to run the feed mechanism or for any other desired purpose, as hereinbefore described. This transmission of power from the shaft $n$ by the pulley $v$ is a continual resistance to and prevents, to the extent of its transmission of power, the overrunning of the speed of the saw-wheel $m'$ from its momentum of the speed of the saw-wheel $m$ on the shaft $o$ when the speed of the saw-wheel $m$ is retarded by the saw entering the cut by overfeed or from any other cause, thus preventing the saw R from being partially released of its strain on the cutting side and vibrating before entering the cut, thus relieving the saw from one of the greatest causes of breaking and uneven work.

When it is not desired to transmit power by the pulley $v$ on the shaft $n$, a belt may be run from it onto the pulley $v'$ on the shaft $o$. The pulley $v$ being larger than the pulley $v'$ on the shaft $o$, will keep the cutting-side of the saw in greater strain than its opposite side, and it will have to overcome the resistance of and continually slip the belt on the pulleys $v$ and $v'$, this having a tendency to continually retard the speed of the saw-wheel $m'$ on the shaft $n$, thus preventing its overrunning, from its momentum, the speed of the saw-wheel $m$ on the shaft $o$ when the speed of the latter wheel is retarded for any cause, as hereinbefore described, thus keeping the cutting-side of the saw from being partially released from strain.

In order to keep the belt that runs on the pulleys $v$ and $v'$ out of the way of the operator and the material being sawed, and so that the length of belt need not be changed to compensate for different lengths of saws, the belt may be run nearly horizontally back of the machine from the pulley $v$ on the shaft $n$ around an idler and tightener, and from this idler and tightener around the pulley $v'$ on the shaft $o$. The tension of the saw on its cutting side can be regulated by giving the belt that runs on the pulleys $v$ and $v'$ more or less tension by its tightener.

When the greatest strength is not desired in the column B, the supporting-bracket F may be left off, and the bracket-arm P will be made longer and secured to the column B instead of to the bracket F. The cap $q$ may also be left off of the tops of the columns B and C, when the greatest strength is not desired, leaving each to stand independent of the other, they being firmly secured to the base-plate A will be sufficiently rigid. The pulley $v$ may also be left off of the shaft $n$, and the pulley $v'$ off of the shaft $o$, dispensing with the belt that runs on these pulleys, the saw-wheel $m'$ being run without retarding its speed.

I am aware that in endless band-saw machines in which the saw runs continually in the same direction the saw-wheel $m'$ has been hung in journals close to the wheel or in vertically-sliding journals having a short bearing, so that the wheel is liable to vibrate when doing heavy work from a true line while running, thus running the saw out of the true line of the plane of its revolution. I obviate this by securing the saw-wheel $m'$ on a shaft of considerable length, which is journaled in the top of the adjustable yoke-bracket D, which is hung and supported in the main supporting-column B and auxiliary supporting-column C, thus securing the most rigid hanging; at the same time it can adjust itself to any expansion of the saw by the lever $r$ and weight S.

I am aware that feed mechanism has been used substantially the same as that shown in my drawings and described in the specifications, and that the vertically-sliding arm $f$, the stationary guide-arm P', the screw $l$, the lever $r$, and weight S, all substantially as I have shown and described them, have been used, so I do not claim them as my invention. The shaft $o$ and saw-wheels $m$ and $m'$ have been used before, so I do not claim them, only in combination with what is new.

What I do claim as my invention, and desire to secure by Letters Patent, is—

1. In a band-saw machine, the combination of a base-plate, supporting-columns B and C, upper and lower saw-wheels journaled therein, an endless saw carried on said wheels, and means for adjusting the upper wheel to regulate the tension of the saw, substantially as described.

2. In a band-saw machine, the combination of two supporting-columns fastened together at their upper ends and resting on and secured to a base-plate, an adjustable bracket having vertical movement on said columns, and means for securing and adjusting said bracket thereto, substantially as described.

3. In a band-saw machine, the combination of supporting-columns B and C, secured to a base-plate, upper and lower band-wheels, the lower wheel journaled in column B, the upper wheel having adjustable bearings in a bracket secured to both columns, and the mechanism for adjusting the same, substantially as described.

4. In a band-saw machine, the combination of two supporting-columns, upper and lower saw-wheels, an adjustable bracket supporting the upper wheel on a shaft having bearings therein, which bracket is secured to both of said columns, whereby uniform and steady movement is given to said wheel, sliding plates in each of said columns for supporting said bracket, and means for adjustably securing the same, substantially as described.

5. In a band-saw machine, the combination of the supporting-columns B and C, resting on and secured to a base-plate, band-wheels $m$ and $m'$, band-wheel $m$ being carried on shaft $o$, having suitable bearings, band-wheel $m'$ being carried on shaft $n$, having three bearings in bracket D, one on the outside of the wheel and the other two nearly opposite the supporting-columns B and C, whereby uniform motion is given to said wheel, the endless saw, and adjusting and operating mechanism, substantially as described.

6. In a band-saw machine, the combination of the base supporting two columns, B and C, upper and lower band-wheels, the lower band-wheel being carried on a shaft having three bearings, one on the base, one on the lower portion of column B, and one on a bracket rigidly suspended from the column B, the upper band-wheel being carried on a shaft having three journal-bearings upon a bracket adjustably supported on both columns, and means for operating the same, substantially as and for the purposes set forth.

7. In a band-saw machine, the combination of the base-plate A, supporting-columns B and C, cap $q$, adjustable bracket D, sliding plates $g$ and $h$, band-wheels $m$ and $m'$, endless saw R, brackets E and F, guide-arms P, $f$, and P', and mechanism for adjusting and operating the same, substantially as described.

DAVID K. ALLINGTON.

Witnesses:
LEWIS C. SLADE,
F. E. MOORE.